United States Patent [19]

Heinrich

[11] 4,009,973
[45] Mar. 1, 1977

[54] SEAL FOR HYDRAULIC PUMPS AND MOTORS

[75] Inventor: Allan E. Heinrich, Oconomowoc, Wis.

[73] Assignee: Applied Power Inc., Milwaukee, Wis.

[22] Filed: Aug. 21, 1975

[21] Appl. No.: 606,638

[52] U.S. Cl. .............................. 418/104; 418/149; 418/267; 418/268; 277/153

[51] Int. Cl.² ......................................... F01C 19/00

[58] Field of Search .......... 418/104, 149, 259, 260, 418/266, 267, 268; 277/153

[56] References Cited

UNITED STATES PATENTS

| 1,858,681 | 5/1932 | Olson | 418/268 |
|---|---|---|---|
| 2,289,387 | 7/1942 | Stephens | 418/266 |
| 2,980,029 | 4/1961 | Moulton et al. | 418/267 |
| 3,031,975 | 5/1962 | Erdmann | 418/267 |
| 3,645,647 | 2/1972 | Ciampa | 418/267 |
| 3,919,448 | 11/1975 | Dufresne | 277/153 |

FOREIGN PATENTS OR APPLICATIONS

| 512,752 | 5/1955 | Canada | 277/153 |
|---|---|---|---|
| 1,143,683 | 2/1963 | Germany | 277/153 |
| 1,025,884 | 4/1966 | United Kingdom | 277/153 |
| 1,057,629 | 2/1967 | United Kingdom | 277/153 |

Primary Examiner—C. J. Husar
Attorney, Agent, or Firm—John J. Byrne; Edward E. Dyson

[57] ABSTRACT

A seal for a vane type fluid pressure motor or pump. The motor or pump comprises a housing having a chamber receiving a rotor, an elongated bore extends through the housing and the rotor and receives a shaft which is drivingly engaged by the motor through a splined connection. A seal assembly is disposed on either side of the rotor to prevent leakage from the area between the side walls of the rotor and the side walls of the chamber and into the elongated bore. Each seal assembly is comprised of a cylindrical sleeve affixed to a side wall of the rotor and extends axially therefrom. The assembly is disposed in an annular recess in the bore at a point adjacent the rotor. The sleeve is affixed to the rotor for rotation therewith and is spaced from an undercut portion of the housing wall. The undercut defines the annular recess. An annular elastomeric sealing member is disposed in the recess and is affixed at its radially outward side to the recess wall and surrounds and snugly engages the sleeve. The oil seal assembly is independent of the shaft. The sealing member is constructed so that the leakage pressure assists in forcing the member into further sealing engagement with the rotating sleeve.

7 Claims, 5 Drawing Figures

SEAL FOR HYDRAULIC PUMPS AND MOTORS

BACKGROUND AND FIELD OF THE INVENTION

This invention relates to hydraulic motors or pumps and more particularly to seals for use in such apparatus.

The seal of this invention is particularly useful with vane type hydraulic pumps or motors including a housing, a rotor received within said housing having radially reciprocating vanes therein which engage and ride on a fixed stator or cam ring surrounding the rotor. The seal is useful with pumps and motors of the prior art. Motors and pumps of the prior art comprise a housing, a vane-carrying rotor received in said housing and a stator or cam ring encircling said rotor. An elongated bore extends axially and centrally through said housing and rotor and receives a sleeve which is drivingly engaged by said rotor. The sleeve is journaled for rotation at its end portions through suitable bearing means disposed in recessed offsets in the bore and receives a power take-off shaft.

For purposes of this application, the apparatus in which the seal of this invention is employed is described as a motor though it is to be understood that it is equally adaptable to and effective in hydraulic pumps of similar structure. For many uses of fluid translators of the type described herein, it is advantageous to install the motor in a manner in which the shaft which is drivingly engaged by the rotor, is a permanent part of the mechanism being driven and not a part of the motor. For these types of field applications, sealing is independent of the shaft.

In the aforementioned field, and in most of the motors of the prior art employing a vane-carrying rotor, the leakage along the opposite side walls of the rotor and rotor chamber is a common problem requiring the use of seals at some point in the side wall surfaces of the rotor housing or requiring a shaft and shaft seal which is a permanent and integral part of the motor. The most common type of side wall seal employed is a four-lobed, homogeneous, annular seal. The four-lobed seals are received in annular recesses either in the rotor wall or in the side wall of the rotor chamber. The seal of this invention to be described below is designed to replace the aforementioned seals and to effectively prevent leakage from the area between the side walls of the rotor and the opposed surface of the rotor chamber. One of the main drawbacks to using four-lobed seals in this particular area is that the pressure from the fluid tends to distort the four-lobed seal in the annular recess and, in fact, move a part of the ring out of sealing engagement with the opposite surface. Methods can be devised to reduce O-ring distortion. However, side wall seals of this type lend to continually seep a small amount of fluid due to surface imperfections in the annular groove or in the side walls which the O-rings engage. This leakage tends to increase as pressure increases. Further, seals of the prior art are generally not readily accessible and their dispositions oftentimes require the complete disassembly of the housing and removal of the rotor.

It is an objective of this invention to provide a hydraulic motor seal which overcomes the above-mentioned drawbacks of the prior art.

More particularly, it is an objective of this invention to provide a seal which is independent of a shaft.

It is a further objective of this invention to provide a seal which will result in essentially no leakage.

It is a further objective of this invention to provide a seal which is forced into tighter sealing engagement as the fluid pressure acting against it increases.

It is a further objective of this invention to provide a seal which is readily accessible for replacement or repair as the need arises.

SUMMARY OF THE INVENTION

The seal of this invention is disposed within recesses formed in offset portions of the elongated bore on each side of the rotor and adjacent thereto. Each seal comprises a cylindrical sleeve whose longitudinal axis is parallel to the longitudinal axis of the bore and which has a radially extending flange attached to one end thereof. The flanged sleeve is bonded or otherwise attached to the side walls of the rotor. Accordingly, the cylindrical sleeve portions extend axially outwardly away from the rotor on opposite sides thereof. The inner diameter of the sleeve and the length thereof relative to the bore and recess is such that the sleeve is disposed fully within the confines of the recess so as to not provide any obstruction to the insertion of a drive shaft into the elongated bore. A sealing member is received in the space defined by the recess floor and the sleeve effecting a seal therebetween and preventing fluid leakage from the area between the opposed side walls of the rotor and rotor chamber to the elongated bore. The seal is independent of the drive shaft. The sealing element is so formed to deflect into greater sealing engagement with the floor of the recess and the sleeve in proportion to an increase in the fluid pressure acting on the element.

These and other objects of the invention will become more apparent to those skilled in the art by reference to the following detailed description when viewed in light of the accompanying drawings wherein:

DETAILED DESCRIPTION OF THE INVENTION

Figure 2:
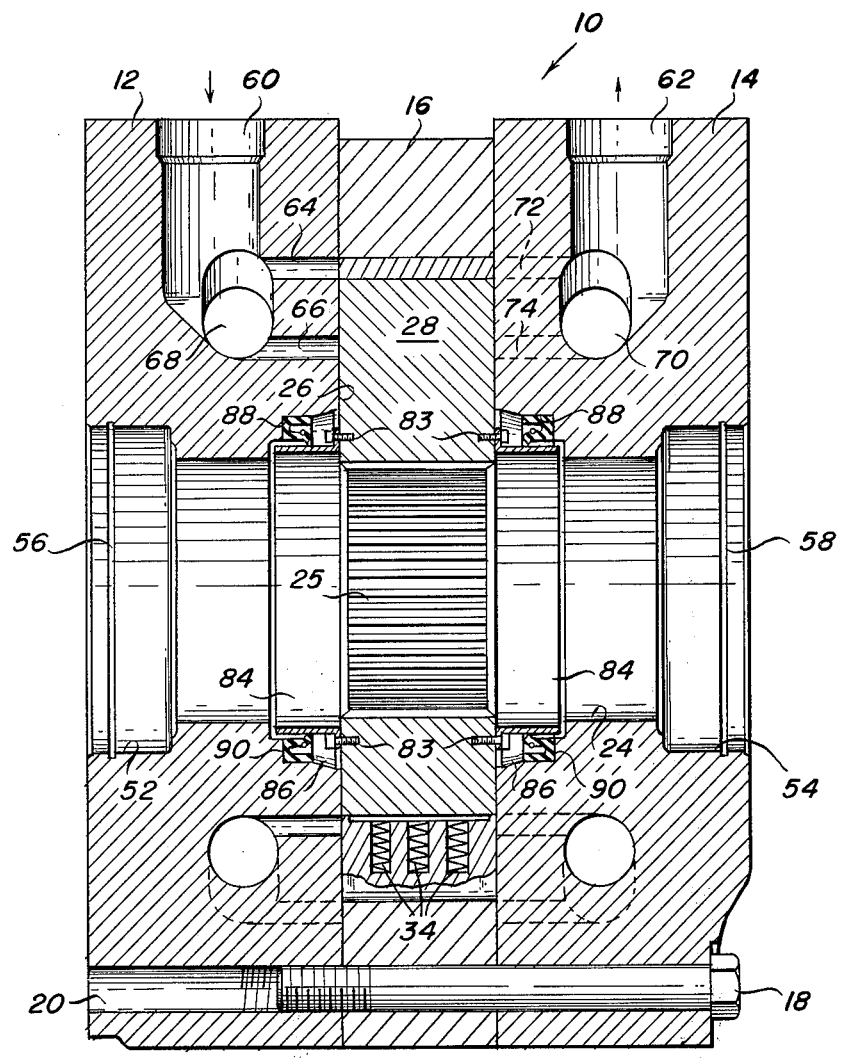
FIG. 2 is a cross-sectional view taken along lines 2—2 of FIG. 1.
Figure 3:
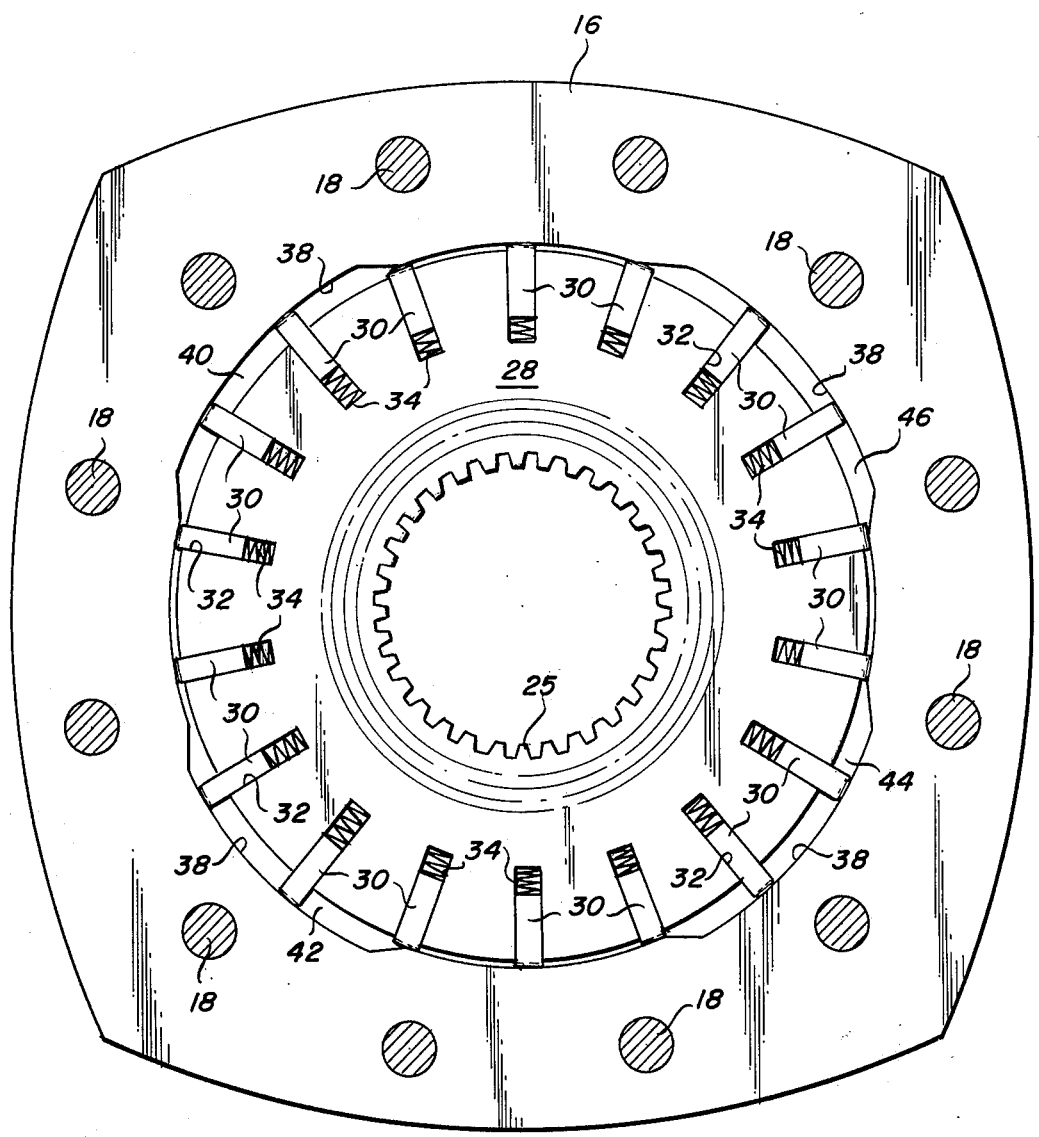
FIG. 3 is a cross-sectional view taken on lines 3—3 of FIG. 1.

Referring now to the drawings wherein like numerals indicate like parts, the numeral 10 generally indicates the motor of this invention. The motor housing is comprised of end covers 12 and 14 and a stator or cam ring 16 disposed therebetween. The components are joined in axially spaced relationship by bolts 18 which extend through end plate 14 and stator 16. The bolts are threadedly received in bores 20 of plate 12. Though not shown, it is to be understood that bolts are also inserted from the other side, through plate 12, stator 16 to end plate 14. A shaft-receiving opening 24 extends axially and centrally through the motor 10, as best seen in FIG. 2. The end plates 12 and 14 and stator 16 when joined together define a rotor chamber 26 which receives rotor 28. The rotor 28 is in the form of an annular ring having a plurality of radially slidable vanes 30 therein received in radial slots 32 in the periphery of the rotor. The vanes are urged radially outwardly and into engagement with the cam ring 16 by means of springs 34. The stator or cam ring 16 is provided with four undercut sections 38 which, with the peripheral surface of the rotor 28, define working chambers 40, 42, 44 and 46. The undercut portions 38 are coaxial with the rotor 28 throughout a substantial portion of their peripheral lengths, or through the distance A—A. As is conventional in the art, the vanes alternately expand and contract the working chambers, with the chambers being communicated to fluid pressure supply and exhaust in proper sequence with the alternate expansion and contraction thereof.

The central opening of the rotor coincides and is axially aligned with the opening or bore 24 and is provided with axially extending splines 25 which mate with and drivingly engage splines on a shaft received in the bore 24. In the embodiment shown in the drawings, the rotor directly engages the shaft and in this regard, the shaft serves to locate the rotor relative to the cam ring 16 and the end plates 12 and 14. It is to be understood that the shaft is, in turn, located and suitably journaled in bearings. The bearings may be received in bearing seats 52 and 54 or the bearings and shaft may be a permanent part of a machine with which the motor is used. Grooves 56 and 58 are provided in the bearing seats 52 and 54 for receiving snap rings to hold the bearings in place. In some prior art motors externally and internally splined cylindrical sleeves are received in the central bores of the motor and are drivingly engaged by the rotor. The sleeves are journaled in bearings while the shafts are, in turn, received in internally splined sleeves to drivingly engage corresponding splines on their respective shafts.

The end covers 12 and 14 are similar in construction and include inlet and outlet passageways 60 and 62 respectively. The direction of rotation of the motor is reversed by reversing the communication of passageways 60 and 62 to supply and exhaust respectively. As can best be seen with reference to FIG. 2, each of the inlet-outlet passageways 60 and 62 communicates through axial passageways 64 and 66 which communicate with four equally spaced ports lying in a circular pattern on the end plates, and being so radially spaced in the center of the motor as to communicate with the working chambers 40 through 46. The axial passageways 64 and 66 for each working chamber are communicated to the inlet and outlet ports 60 and 62 by annular passageways 68 and 70. Passageways 72 and 74 also are communicated with the annular passageway 70 and serve as means for balancing the pressures on the rotor 28.

The primary purpose of this invention is to provide a seal means for preventing leakage of fluid from the interface area of the rotor 28 and the side walls of the rotor chamber 26. Many prior art pumps and motors utilize four-lobed homogeneous seals seated in a groove on one of the side wall surfaces. Drawbacks in the prior art seals of this type have been mentioned. One of the more serious drawbacks is that the pressures acting on the seals tend to distort and consequently force them out of engagement with the opposite side wall, thereby permitting fluid to leak into the area of the central bore 24.

Figure 1:
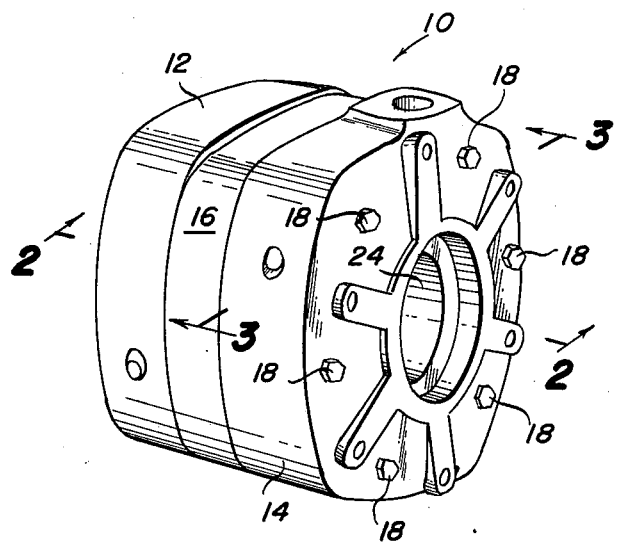
FIG. 1 is a perspective view of a motor for which the seal of this invention is particularly useful.
Figure 4:
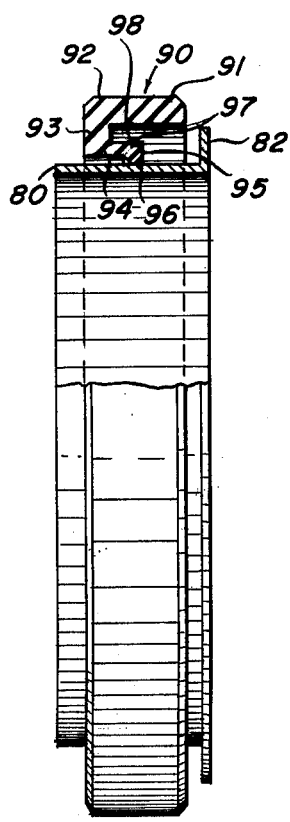
FIG. 4 is a partial cross-sectional view in elevation of the seal of this invention.
Figure 5:
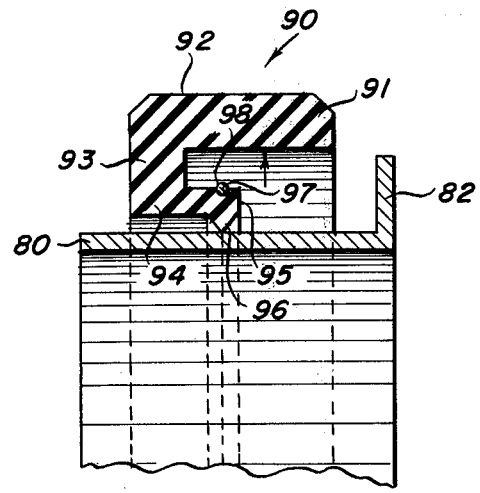
FIG. 5 is an enlargement of the cross-sectional portion of FIG. 4.

Referring now particularly to FIGS. 4 and 5, the seal of this invention includes an annular sleeve 80 having a radial flange 82 formed on one end thereof. The radial flange 82 is secured by bonding and screws 83 to the side wall of the rotor 28 in the manner shown in FIG. 2. The bore 24 is provided with a counterbore 84 of increased diameter on each side of the rotor 28 to define a recess 86, the recess 86 exposing a portion of the side wall of the rotor. The flange 82 is bonded to that exposed portion of the side wall of the rotor. The sleeve 80 has an inner diameter slightly greater than the bore 24 but less than that of the counterbore 84. Consequently, sleeve 80 can be received within the radial confines of the recess 86 as seen in FIG. 2. The purpose of this is to prevent the sleeve from obstructing or otherwise interfering with the insertion of the drive shaft. Counterbore 84 has a floor portion 88 to which is bonded an annular elastomeric seal 90. In cross section, the seal 90 has an elongated body portion 91 and a flattened peripheral outer surface 92. Surface 92 is bonded cylindrically to surface 88 of the counterbore. Integral with body portion 91 is a radially inwardly directed portion 93 extending from the end of the body 91 to a return portion 94. Return portion 94 is terminated by a sleeve-engaging portion 95. The sleeve-engaging portion 95 is provided with tapered edge 96 which provides line contact between the elastomeric member and the outer peripheral surface of the sleeve 80. A retaining ring 98 is received in a groove 97 on the reverse side of the sleeve-engaging portion opposite the tapered edge and is of sufficient diameter to urge the tapered edge into engagement with the sleeve.

In operation, the sleeve 80 rotates with the rotor while the sealing element 90 remains stationary. As the leakage pressure increases, pressure acts on the seal in the direction of the arrows as shown in Figure to increase the sealing pressure against the floor of the recess.

In a general manner, while there has been disclosed an effective and efficient embodiment of the invention, it should be well understood that the invention is not limited to such embodiment as there might be changes made in the arrangement, disposition, and form of the parts without departing from the principle of the present invention as comprehended within the scope of the accompanying claims.

I claim:
1. A fluid pressure translator comprising a rotor, a cam ring surrounding said rotor and defining a plurality of working chambers therewith, slidable vanes received in radial slots in said rotor and normally biased into abutment with said cam ring, a housing for said rotor defining a rotor chamber having sidewall surfaces facing the side walls of said rotor, a central axially extending bore in said housing and said rotor and adapted to receive a shaft, means for drivingly engaging said rotor with said shaft, and sealing means on each side of said rotor for preventing leakage of fluid from the area between said side wall surfaces and rotor side walls and into said bore, said sealing means each comprising a cylindrical sleeve attached to said rotor and extending axially therefrom in said bore and radially spaced from said housing, and an annular elastomeric sealing member disposed between said sleeve and said housing.

2. The translator of claim 1 wherein said engaging means comprises axially extending mating splines on said rotor and said shaft.

3. The translator of claim 1 wherein a radially extending flange is affixed to the end of said sleeve adjacent said rotor and said flange is attached to one side wall of said rotor.

4. The translator of claim 1 wherein said bore is provided with an annular recess on each side of said rotor and adjacent thereto, said sealing member being disposed in said recess and affixed to said housing, said sleeve having a greater inner diameter than that of said bore and being disposed within said recess.

5. The translator of claim 1 wherein said sealing member comprises an annular body portion elongated in cross section engaging said housing, a radially inwardly directed annular projection attached to said body portion adjacent the end thereof away from said rotor and having a lower end, an annular sleeve engaging portion extending from the lower end of said projection toward said rotor, said sleeve engaging portion being radially inwardly spaced from said body member to define with said projection and body member a partially enclosed annular area opening at one side toward said rotor whereby fluid pressure from the area being sealed forces said body member and said sleeve engaging portion radially outwardly and inwardly respectively into tighter sealing engagement with said housing and sleeve.

6. The translator of claim 5 and including a retaining ring encircling said sleeve engaging portion and urging it into engagement with said sleeve.

7. The translator of claim 5 and including a tapered edge on said sleeve engaging portion for making line contact with said sleeve.

* * * * *